Oct. 20, 1959    R. P. MAROHN ET AL    2,909,721
LOAD RATIO CONTROL CIRCUIT WITH NEUTRALIZER WINDING
Filed May 12, 1955

Inventors
Richard P. Marohn
William C. Sealey
by Richard E. Cummins
Attorney

United States Patent Office 2,909,721
Patented Oct. 20, 1959

2,909,721

LOAD RATIO CONTROL CIRCUIT WITH NEUTRALIZER WINDING

Richard P. Marohn, Elm Grove, and William C. Sealey, Wauwatosa, Wis., assignors to Allis-Chalmers Manufacturing Company, Milwaukee, Wis.

Application May 12, 1955, Serial No. 507,801

5 Claims. (Cl. 323—43.5)

This invention relates in general to transformer tap changing circuits and in particular to an improvement in tap changing circuits which employ a midtap reactor in circuit with auxiliary winding means to reduce the voltage across the midtapped reactor.

The various types of tap changing under load transformers which have been suggested in the prior art usually employ a winding having a plurality of electrically spaced taps, a midtapped reactor or a preventive autotransformer, and suitable switching means. The ends of the reactor are connected to adjacent transformer taps by the switching means in which position the voltage of the transformer will correspond to a voltage midway between the transformer taps, or the ends of the reactor may be connected to the same tap in which position the voltage of the transformer corresponds to the particular tap voltage. Normally the load current from the transformer divides equally between the two halves of the reactor, except during a tap changing operation when the load current flows through only one half of the reactor.

In such a circuit the kva. rating of the reactor is determined by the voltage between taps and the circulating current flowing through the reactor when the reactor is connected across electrically adjacent taps. It has been suggested in the prior art that the kva. rating required of the reactor could be lowered by inserting between each end of the reactor and the switching means, separate voltages equal to one quarter of the tap to tap voltage. The separate voltages are obtained by providing two separate auxiliary windings on the transformer core, the relative polarities of these auxiliary windings being such that the voltage across the reactor is one half the voltage between taps regardless of whether the ends of the reactors are connected to the same or to electrically adjacent taps.

This suggested arrangement has proved quite successful in reducing the kva. rating of the reactor, making it possible to use a much smaller and less expensive reactor. However, the arrangement has a serious disadvantage in that in practice one quarter of the tap to tap voltage may represent a fractional turn on the transformer core which is not practically obtainable. For example, assuming that there are six full turns between adjacent taps on the main transformer winding, a one-fourth tap to tap voltage represents an auxiliary winding of one and a half turns which is not practically obtainable.

Under these conditions in order to obtain a one-quarter tap to tap voltage it is necessary to provide an auxiliary transformer for each auxiliary winding, the size and cost of which practically eliminates the advantages gained in reducing the kva. rating of the reactor.

The present invention provides an improved circuit arrangement which under certain conditions eliminates the above mentioned disadvantages of the prior art while still maintaining all the advantages.

It is therefore one object of the present invention to reduce the voltage across the midtapped reactor of a transformer tap changing circuit in order to use a smaller and less expensive midtapped reactor.

Another object of the present invention is to provide in a tap changing under load transformer a greater selection of turns between taps which do not require the use of two auxiliary transformers to reduce the voltage across the reactor in the tap changing circuit.

Objects and advantages other than those mentioned above will be apparent from the following description when read in connection with the drawing in which.

Figure 1:
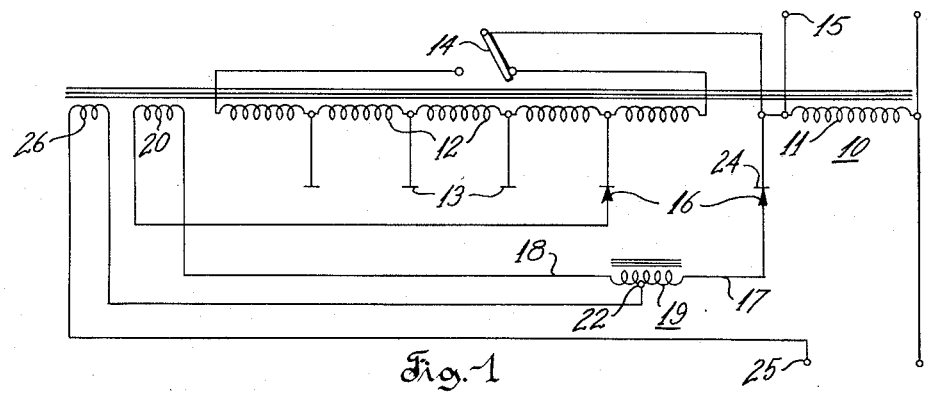
Fig. 1 is a diagrammatic illustration of a tap changing under load transformer provided with the improved circuit.

Referring to Fig. 1 the tap changing under load transformer 10 comprises a shunt winding 11, a tapped series winding 12 provided with a plurality of spaced taps 13 between any electrically adjacent pair of which there is the same potential difference. A reversing switch 14 may also be provided between winding 12 and the supply terminal 15.

Switching means 16 of any suitable type known in the art are also provided for selectively connecting the ends 17 and 18 of the midtapped reactor 19 to the same or different ones of the tap 13.

In order to reduce the voltage across reactor 19 and thereby allow a smaller and less expensive reactor to be used, means comprising a first auxiliary winding 20 is provided for inserting between end 18 of reactor 19 and switching means 16 a voltage which is equal to one half the voltage existing between each pair of electrically adjacent taps 13. Auxiliary winding 20 is connected between end 18 of reactor 19 and switching means 16 and in practice has one half the number of turns existing between each pair of taps 13. The polarity of winding 20 is in opposition to that of tapped series winding 12 so that the voltage across reactor 19 is always one half the voltage across electrically adjacent taps regardless of whether the switching means 16 connects the ends 17 and 18 of the reactor 19 to the same or adjacent taps 13.

From analyzing the circuit containing reactor 19, switching means 16 and auxiliary winding 20, it will be readily seen that the voltage at the midtap 22 of reactor 19 when both ends of the reactor are connected to one of the taps is below the voltage of that particular tap by an amount equal to one quarter of the tap to tap voltage. Likewise when the ends of reactor 19 are connected to electrically adjacent taps, the potential of midtap 22 is one quarter of the tap to tap voltage below the voltage midway between taps.

Under these conditions every time the tap changing equipment needs servicing the entire transformer must be removed from the line thereby momentarily interrupting service to the load. The regulator cannot be bypassed by a simple jumper between its terminals because even when switching means 16 connects the ends of the reactor 19 to zero voltage tap 24 of winding 12 the load terminal 25 of transformer 10 is at a different voltage than supply terminal 15.

In order to provide a tap position on the tap changing under load transformer 10, at which the load terminal 25 is at the same voltage of supply terminal 15, means comprising a second auxiliary winding 26 is provided for inserting between the midtap 22 of reactor 19 and a terminal of the transformer 10 a voltage equal to one quarter of the voltage existing between taps. As shown in Fig. 1, second auxiliary winding 26 is connected between midtap 22 and load terminal 25 of transformer 10 and in practice comprises one fourth the number of turns between the taps. Auxiliary winding 26 is of opposite polarity with respect to auxiliary winding 20. Besides providing a bypass position for transformer 10, winding 26 also causes the terminal voltage of transformer 10 to correspond exactly to the voltage of the tap to which switching means 16 is connected, or the voltage midway between adjacent taps when the reactor is connected across adjacent taps.

With the arrangement suggested by the prior art which inserts a separate potential equal to one fourth of the tap to tap voltage between each end of the reactor and the switching means, the choice of the number of turns between taps is limited to a value of four or multiples thereof. For example, assume that each turn of winding 12 represents ten volts. The tap to tap voltage then must be forty volts or multiples of forty volts in order to utilize the teaching of the prior art. If it is desired to use twenty volts between taps then two auxiliary transformers must be provided in order to convert the respective voltages of the auxiliary windings to values equal to one fourth the tap to tap voltage. Therefore whenever the number of turns between taps is not four or a multiple of four, two auxiliary transformers are required. The provision of two auxiliary transformers is expensive and at times exceeds the cost of providing a midtapped reactor sufficient to operate on the full tap to tap voltage.

The circuit shown in Fig. 1 accomplishes exactly the same results as taught by the prior art when it is desired to use a number of turns between taps which is four, or a multiple of four. In addition, it is possible to eliminate one auxiliary transformer under certain conditions which heretofore have required the use of two auxiliary transformers. Specifically whenever the turns between taps is a multiple of two and not a multiple of four, one auxiliary transformer is eliminated by the use of the present invention shown in Fig. 1. Or in other words with a predetermined voltage per turn design, there are more choices of tap to tap voltages than was previously provided by the prior art.

Figure 2:
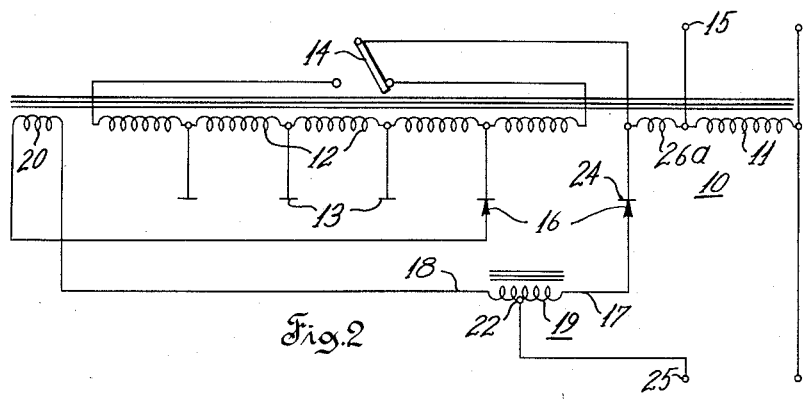
Fig. 2 illustrates a modification of the improved circuit shown in Fig. 1.

Fig. 2 shows a modification of the tap changing under load transformer shown in Fig. 1 and is similar thereto except that the second auxiliary winding referred to by reference character 26a is connected between the supply terminal 15 and the tapped winding 12. The operation of the circuit shown in Fig. 2 and the results obtained therefrom are similar to those previously described with respect to Fig. 1.

Figure 3:
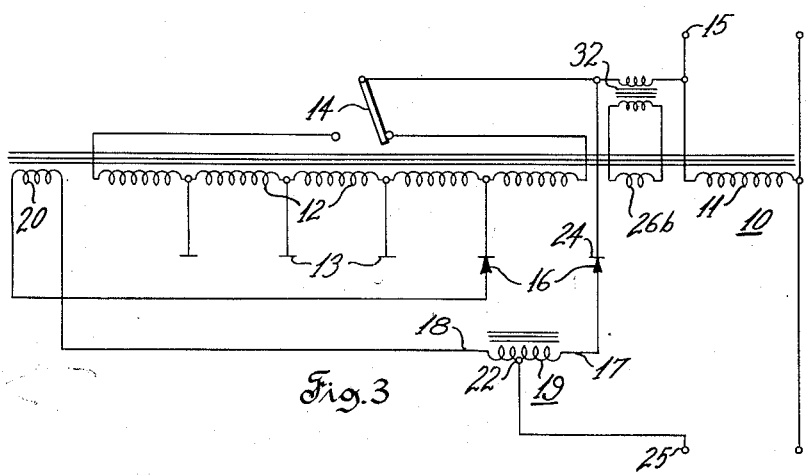
Fig. 3 illustrates a modification of the circuit shown in Fig. 2.

Fig. 3 shows a modification of the tap changing under load transformer in which the number of turns between taps 13 is a multiple of two but not a multiple of four. As shown, the number of turns between taps 13 on winding 12 is six. The first auxiliary winding 20 therefore has three turns representative of one half the voltage between taps. The second auxiliary winding 26b comprises either one turn or two turns and an auxiliary transformer 32 is provided to either step up or step down the voltage of auxiliary winding 26b, in order to insert a voltage equal to one quarter of the tap to tap voltage between terminal 15 and midtap 22 of reactor 19. The operation of the circuit shown in Fig. 3 is substantially the same as that previously described with respect to Fig. 1.

While only three embodiments of the present invention have been illustrated and described, it will be apparent to those skilled in the art that modifications other than those shown may be made without departing from the spirit of the invention or from the scope of the appended claims.

It is claimed and desired to secure by Letters Patent:

1. A tap changing under load transformer comprising a supply terminal, a load terminal, a main winding having a plurality of spaced taps between any electrically adjacent pair of which there is the same potential difference, a midtapped reactor, switching means for selectively connecting the ends of said reactor to the same or different one of said taps, means for inserting between one end of said reactor and said switching means a first voltage equal to one half of said potential difference to cause the voltage across said reactor to equal one half the voltage between electrically adjacent taps regardless of whether said switching means connects the ends of said reactor to the same or adjacent taps, and means for inserting between the midtap of said reactor and a terminal of said transformer a second voltage equal to one quarter of said potential difference, the relative polarities of said first and second voltages being in opposition causing said terminals to be at the same potential when the ends of said reactor are connected to a predetermined one of said taps.

2. A tap changing under load transformer, comprising a supply terminal, a load terminal, a main winding having a plurality of spaced taps between any electrically adjacent pair of which there is the same potential difference, a midtapped reactor, switching means for selectively connecting the ends of said reactor to the same or different one of said taps, means for inserting between one end of said reactor and said switching means a first voltage equal to one half said potential difference, the polarity of said first voltage with respect to the polarity of said main winding being in opposition to cause the voltage across said reactor to equal one half the voltage between electrically adjacent taps regardless of whether said switching means connects the ends of said reactor to the same or adjacent taps, and means for inserting between the midtap of said reactor and a terminal of said transformer a fixed second voltage equal to one quarter of said potential difference, the relative polarities of said first and second voltages being in opposition causing said terminals to be at the same potential when the ends of said reactor are connected to a predetermined one of said taps.

3. A tap changing under load transformer comprising a supply terminal, a load terminal, a main winding having a plurality of spaced taps between any electrically adjacent pair of which there is the same potential difference, a midtapped reactor, switching means for selectively connecting the ends of said reactor to the same or different ones of said taps, first means for inserting between one end of said reactor and said switching means a first voltage equal to one half of said potential difference to cause the voltage across said reactor to equal one half the voltage between electrically adjacent taps regardless of whether said switching means connects the ends of said reactor to the same or adjacent taps, said first means including a first auxiliary winding connected between said one end of said reactor and said switching means, and second means for inserting between the mid tap of said reactor and said load terminal a second voltage equal to one quarter of said potential difference, said second means including a second auxiliary winding inductively coupled with said main winding and connected between the midtap of said reactor and said load terminal, the relative polarities of said first and second voltages being in opposition causing said terminals to be at the same potential when the ends of said reactor are connected to a predetermined one of said taps.

4. A tap changing under load transformer comprising a supply terminal, a load terminal, a main winding having a plurality of spaced taps between any electrically adjacent pair of which there is the same potential difference, a midtapped reactor, switching means for selectively connecting the ends of said reactor to the same or different one of said taps, first means for inserting between one end of said reactor and said switching means a first voltage equal to one half of said potential difference to cause the voltage across said reactor to equal one half the voltage between electrically adjacent taps regardless of whether said switching means connects the ends of said reactor to the same or adjacent taps, said first means including a first auxiliary winding connected between said one end of said reactor and said switching means, and second means for inserting between the midtap of said reactor and said supply terminal, a second voltage equal to one quarter of said potential difference, said second means including a second auxiliary winding connected between one end of said main winding and said supply terminal, the relative polarities of said first and second voltages being in opposition causing said terminals to be at the same potential when the ends of said reactor are connected to a predetermined one of said taps.

5. A transformer comprising a supply terminal, a load terminal, a main winding having a plurality of conductor turns and a plurality of spaced taps between any electrically adjacent pair of which there is the same potential difference, the number of said conductor turns between any electrical adjacent taps being two or multiples of two but not multiples of four, a midtapped reactor, switching means for selectively connecting the ends of said reactor to the same or different ones of said taps, first means for inserting between one end of said reactor and said switching means a first voltage equal to one half of said potential difference to cause the voltage across said reactor to equal one half said potential difference regardless of whether said switching means connects the ends of said reactor to the same or adjacent taps, said first means including a first auxiliary winding inductively related to said main winding and comprising one half the number of turns between taps, said auxiliary winding connected between said one end of said reactor and said switching means, and second means for inserting between the midtap of said reactor and a terminal of said transformer a second potential equal to one quarter of said potential difference, said second means including a second auxiliary winding and an auxiliary transformer for inductively connecting said second auxiliary winding between the midtap of said reactor and one of said terminals, the relative polarities of said first and second voltages being in opposition causing said terminals to be at the same potential when the ends of said reactor are connected to a predetermined one of said taps.

References Cited in the file of this patent
UNITED STATES PATENTS

| | | |
|---|---|---|
| Re. 21,854 | Carson | July 15, 1951 |
| 1,453,491 | Chaplin | May 1, 1923 |
| 1,804,614 | Hill | May 12, 1931 |
| 1,961,801 | St. Palley | June 5, 1934 |
| 2,196,871 | Minneci | Apr. 9, 1940 |
| 2,680,164 | Lennox | June 1, 1954 |